United States Patent
Mankiewicz

[11] Patent Number: 5,948,674
[45] Date of Patent: Sep. 7, 1999

[54] ORGANIC WASTE COMPOSTING SYSTEM

[75] Inventor: Paul S. Mankiewicz, City Island, N.Y.

[73] Assignee: The Gaia Institute, Inc., City Island, N.Y.

[21] Appl. No.: 08/585,990

[22] Filed: Jan. 11, 1996

[51] Int. Cl.$^6$ ................................................ C12M 3/00
[52] U.S. Cl. ................................. 435/290.2; 435/290.4
[58] Field of Search ........................... 435/289.1, 290.1, 435/290.2, 290.4, 267

[56] References Cited

U.S. PATENT DOCUMENTS

| | | | |
|---|---|---|---|
| 4,797,367 | 1/1989 | Pinder | 435/290.1 |
| 5,254,472 | 10/1993 | Brooks, III et al. | 435/290.2 |
| 5,433,524 | 7/1995 | Wiister | 435/290.2 |
| 5,559,033 | 9/1996 | Young | 435/290.3 |

FOREIGN PATENT DOCUMENTS

| | | | |
|---|---|---|---|
| 599 661 | 6/1994 | European Pat. Off. | C05F 17/02 |
| 665 200 | 8/1995 | European Pat. Off. | C05F 17/02 |
| 163477 | 6/1989 | Japan | 435/290.1 |
| 2 138 795 | 10/1984 | United Kingdom | C05F 9/02 |
| WO94/02433 | 2/1994 | WIPO | C05F 17/02 |

OTHER PUBLICATIONS

International Search report.
WPI Abstract AN–93 411817, Derwent Publications Ltd. Nov. 15, 1992.

Primary Examiner—David A. Redding
Attorney, Agent, or Firm—Stroock & Stroock & Lavan

[57] ABSTRACT

An organic waste composting system is provided for rapidly, economically and naturally composting organic waste. A container having a gas impermeable floor, sides and top is provided with a gas inlet port and a gas exhaust port. An air floor is provided within the container, the air floor being gas permeable and impermeable to solids contained within the container. The system farther includes a mixing blade dimensioned so that shear forces produced by the blade when rotated within the organic waste are substantially equal to the viscoelastic forces of the organic waste particles. The mixing blade is dimensioned to further shear the waste to a size which increases its surface area-to-volume ratio without compacting it, thus providing suitable moisture distribution, particle distribution and air channels between particles.

27 Claims, 6 Drawing Sheets

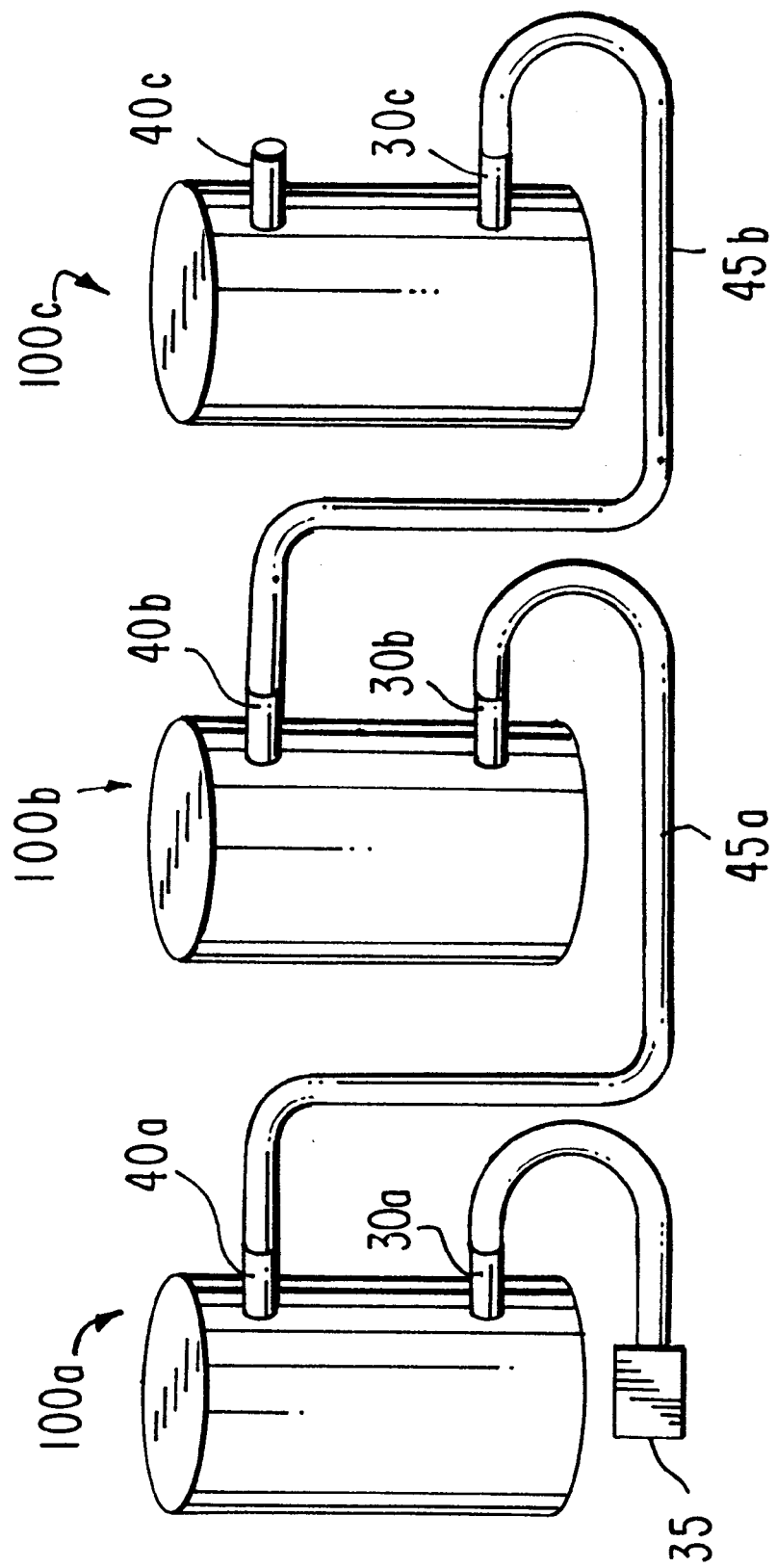

ORGANIC WASTE COMPOSTING SYSTEM

This invention was made with Government support under the Solid Waste Management Assistance Program, assistance agreement identification numbers X002004-01 and X1992090-01-0, awarded by the Environmental Protection Agency. Accordingly, the United States Government has certain rights in this invention.

BACKGROUND OF THE INVENTION

This invention relates generally to a composter, and more particularly to a composter for rapidly, economically and naturally composting organic waste.

Waste can be defined as post-consumer materials with positive economic value removed and negative value added. For instance, "garbage," in its usual sense, carries a cost by occupying space valuable for other purposes thereby requiring transport to and disposal at a waste collection site. Organic materials such as food waste also incur health and sanitation penalties in the form of odor production, attraction of vermin, and the potential for harboring pathogens. When mixed with the rest of the waste stream, the putrescible organic portion makes carting and disposal of the entire solid waste stream substantially more difficult and unpleasant.

Recycling waste materials restores positive economic value and removes negative value. Recycling, when it has been able to work in the face of market mechanisms, recovers materials from the waste stream and feeds them back into the supply stream for some industry or service, thus bringing the material back to the consumer and "closing the loop" by connecting resources, production and consumption in much the same way that closed ecological systems work.

Composting, as a form of recycling, can serve this recovery function for the organic portion of the waste stream which may range from 10% to 30% of the total waste stream. The potential for composting as a solution to the organic solid waste crisis is highlighted by the facts that more than one thousand municipal yard waste compost facilities presently operate in the United States, and that 8% to 20% of American households currently compost in their backyards. Thus, the opportunity and motivation to compost exists.

In the past, most composting has been accomplished at one of two vastly different scales. At the small scale, individuals have manually composted in their backyards or gardens using a simple pitchfork and a compost bin to agitate the waste material to assist the composting process. This process is inexpensive but labor intensive, slow and unpleasant due to the odor of the organic waste. At the very large scale, automatic equipment has been used for moving and mixing organic waste material through a silo, rotating drum or tunnel reactor at high speeds and high RPM. While the labor cost per unit of compost material is low, the equipment is large and very expensive, thus being inappropriate for smaller scale users. Moreover, even with powerful mixing machinery, the rate of composting is still fairly slow, requiring approximately sixty to ninety days to complete. The use of high power, high r.p.m., large surface area blade and auger mixing systems can retard the rate of composting by compacting the compost mixture, resulting in reduced surface area-to-volume ratios and insufficient air circulation throughout the compost mixture required for rapid composting. For instance, because the surface compaction of the organic mixture is roughly proportional to the surface area of the mixing blade, large blades can cause overly large chunks of waste material. In addition, when the force per area imparted by the rapidly turning mixing blade to the compost mixture is greater than the compressive strength of the compost mixture itself, the compost mixture is compressed into clumps. Moreover, any lateral or downward resultant forces imparted by the blade on the mixture will compact the adjacent compost mixture, and any "chunks" of material which are dropped or fall from heights greater than two to three feet will compact the mixture below on impact.

Accordingly, it is desired to provide a small to medium scale composting system which completes the composting process rapidly, yields a substantially odorless product, foregoes the use or production of materials which may be harmful to the environment, and is simple and inexpensive to install and operate.

SUMMARY OF THE INVENTION

An organic waste composting system is provided for rapidly, economically and naturally composting organic waste. A container having a gas impermeable floor, sides and top is provided with a gas inlet port and a gas exhaust port. An air floor is provided within the container, the air floor being gas permeable and impermeable to solids contained within the container. The system further includes a mixing blade dimensioned so that shear forces produced by the blade when rotated within the organic waste are substantially equal to the viscoelastic forces of the organic waste particles. The mixing blade is dimensioned to further shear the waste to a size which increases its surface area-to-volume ratio without compacting it, thus providing suitable moisture distribution, particle distribution and air channels between particles.

To compost organic waste, finished compost is deposited in the container. Organic waste is then deposited in the container. The organic waste and finished compost are then mixed with the blade, and the container lid is placed on the container. Air is forced through the air floor of the container and travels through air channels in the organic waste-finished compost mixture, thus oxygenating the bacteria in the mixture which decomposes the organic waste rapidly and naturally. In an exemplary embodiment, air exhausted through the top of the mixture, which possesses less oxygen but more carbon dioxide, water vapor, heat and ammonia, may be retained and supplied to a second composting system which has reached a later stage of decomposition to promote further decomposition in the second composting system. Air which has flowed through several such systems in series is eventually odorless and may thus be released to the environment without harm.

Accordingly, it is an object of this invention to provide an improved organic waste composting system.

Another object of this invention is to provide an organic waste composting system which rapidly composts organic waste.

A further object of this invention is to provide an organic waste composting system which naturally composts organic waste without the use or production of materials which may be harmful to the environment.

A still further object of this invention is to provide an organic waste composting system which is economical for small to medium scale users.

Yet another object of this invention is to provide an organic waste composting system which removes putrescence from both the finished compost and the air used in the decomposition process.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a perspective view of a plurality of organic waste composting systems of the present invention connected in series in accordance with the present invention.

DETAILED DESCRIPTION OF THE PREFERRED EMBODIMENTS

Figure 1:
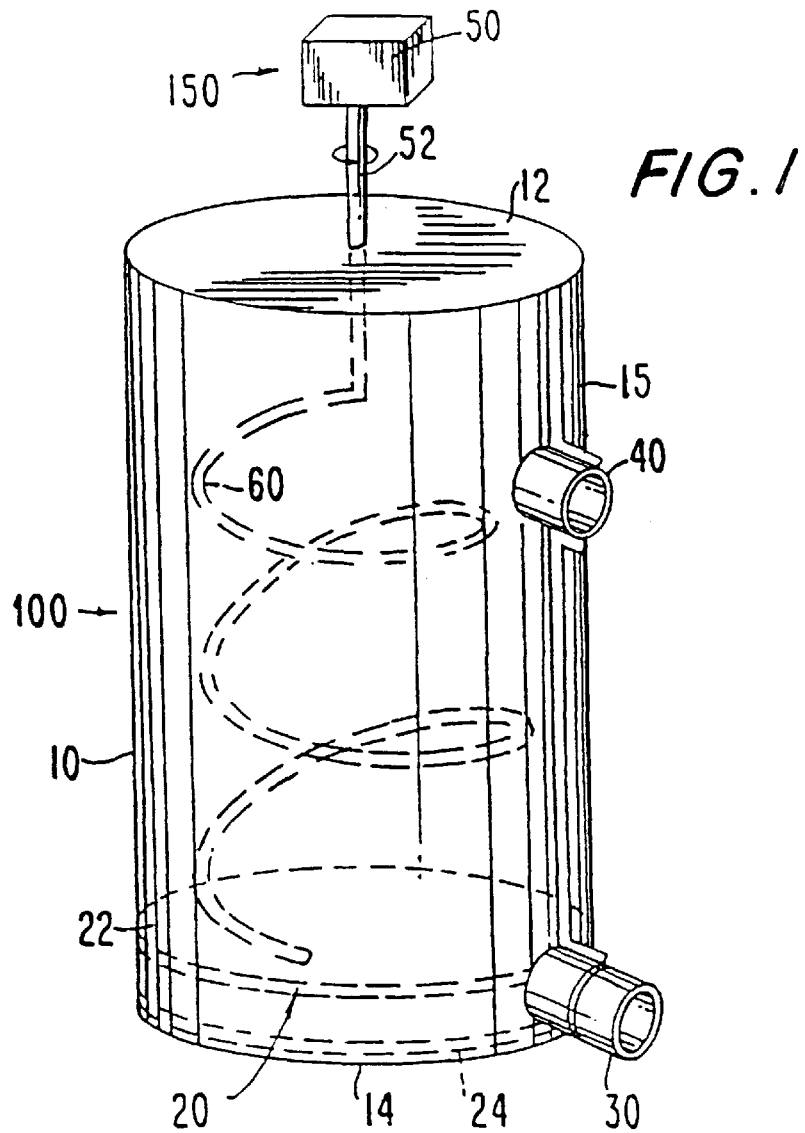
FIG. 1 is a perspective view of an organic waste composting system constructed in accordance with the present invention.

The present invention is directed to a container and mixer which converts a pre-compost mixture of organic waste and compost into a substantially fully composted product. The pre-compost solution contained with in the container is a mixture of organic waste, such as foodstuffs, and an already composted material. As shown in FIG. 1, an organic waste composting system 100 includes a container 10 for forming compost therein and a mixing assembly 150. Container 10 is provided with an air inlet port 30 and an air exhaust port 40.

Figure 2:
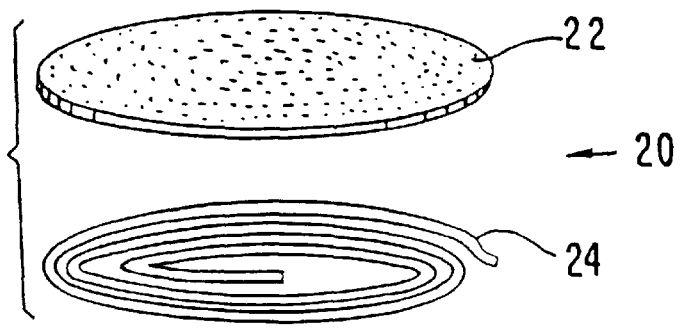
FIG. 2 is an exploded perspective view of an air floor assembly for use in the organic waste composting system of the present invention.

Container 10 includes side wall 15, a sealed bottom 14 and a top 12. Container 10 includes an air inlet port 30 for bringing air into container 10 and an exhaust port 40 for exhausting gaseous by-products from container 10. An air floor 20, is disposed within container 10 above air inlet port 30, is air permeable but impermeable to organic waste and compost. As shown in FIG. 2, a preferred embodiment of air floor 20 includes a perforated, reinforced fabric or plastic disc 22 disposed over a perforated hose 24 which is coiled to fit the inner diameter of container 10. A first end of hose 24 is attached to air inlet port 30 from within container 10. The second end of hose 24 is preferably sealed. Container 10 is gas and liquid impermeable. Container 10 may also be made of other impermeable materials such as rigid plastic or may be made collapsible by using polyvinyl chloride film or the like. Where container 10 is made of a thin film bag, air floor 20 may comprise a pallet upon which sits container 10 with a perforated air floor fabric positioned above a well in the pallet. A fan or blower may be attached directly to the well in the pallet to blow air into container 10. In a preferred embodiment, container 10 is a 55-gallon drum, but may be larger or smaller depending on the user's composting scale. Top 12 may be removable and impermeable to gases.

Mixing assembly 150 preferably comprises a mixing blade 60 depending from a shaft 52 which is rotatably driven by a motor 50. Alternatively, mixing blade 60 and shaft 52 may be manually driven. Shaft 52 may extend through top 12 of container 10 in such a way as to be mounted to top 12 while maintaining the air seal created by removable top 12. Alternatively, mixing assembly 150 may be configured independent of top 12 and may be utilized while top 12 is removed from container 10.

Mixing blade 60 is designed so that the blade width and curvature radius are dimensioned so that the shear forces produced by the rotating blade within the viscous material of a pre-compost mixture are substantially equal to the viscoelastic forces for the particular particle size making up a pre-compost mixture viscous fluid. Blade 60 may be designed as a function of the Reynolds number, Re, where:

$$Re = Ddv/\mu$$

Where D is the scale of the mixing blade, d is the density of the fluid, v is the velocity of the blade within the fluid and u is the viscosity of the fluid. The Reynolds number is not directly applicable to a composting system because the Reynolds number applies to Newtonian fluids where the ratio of shear stress to shear rate is constant, while in a compost the materials within form a colloidal matrix which is plastically deformed under loads. The shape of the blade is also designed to impart an upward force to the particles contained within the container and to leave a high volume of free air space within the composting materials which, as a result, produces materials within the solution which have a high surface area to volume ratio. Blade 60 is also shaped so that when utilized it imparts a substantially upward force to particles contained within container 10 to adequately mix the compost within container 10.

Figure 3:
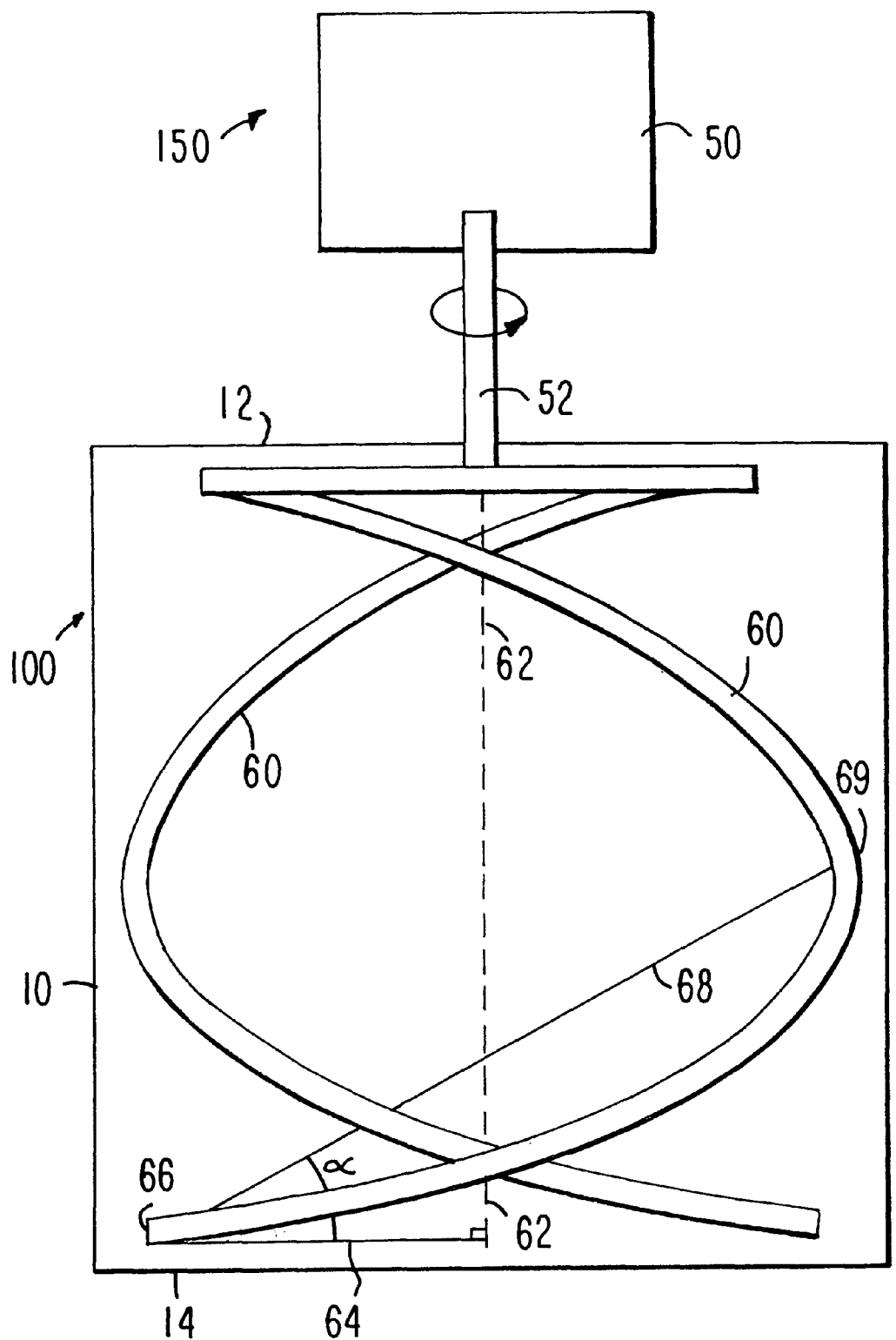
FIG. 3 is a schematic view of a mixing blade of the present invention.

Accordingly, mixing blade 60 is designed to achieve preferred particle sizes within the pre-compost solution without compacting the pre-compost mixture. As shown in FIG. 3, mixing blade 60 is preferably configured in the form of a helix formed about an axis 62. The blade angle α is measured between a perpendicular 64 drawn from axis 62 to any point 66 on the blade 60 and a line 68 drawn from point 66 to a point 69 on the blade 60 which is one-half of one helical gyre above or below point 66. Less steep blade angles tend to produce proper compost mixture particle and free air distribution where the ratio of shear stress to shear rate is roughly equal to the viscoelastic forces sufficient to hold together particles in the 0.1 to 1.0 cubic inch range. Accordingly, blade angle a is generally set in the range of about 10° to about 30°, and is preferably set in the range of about 13.3° to about 26.6°.

Figure 8A:
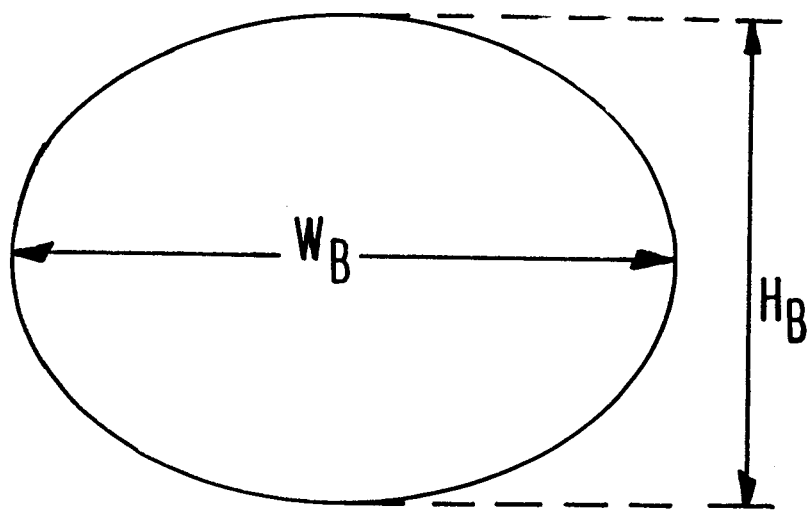
FIG. 8A is a sectional view of the base of the mixing blade of the present invention.
Figure 8B:
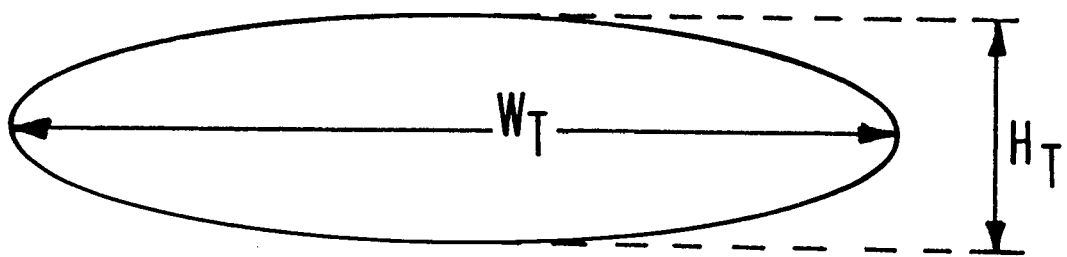
FIG. 8B is a sectional view of the tip of the mixing blade of the present invention.

Further, as shown in FIGS. 8A and 8B, in a preferred embodiment the height of the cross-section of mixing blade 60 preferably flattens gradually from base to tip which moves material from the bottom to the top of the container more effectively. At the base, mixing blade 60 preferably has a cross-sectional width, $W_B$, of ¼" to ½" and a cross-sectional height, $H_B$, of ⅜" to ⅝". At the tip, the mixing blade 60 preferably has a cross-sectional width, $W_T$, of ½" and a cross-sectional height, $H_T$, of 1/16" to ⅛".

Figure 4:
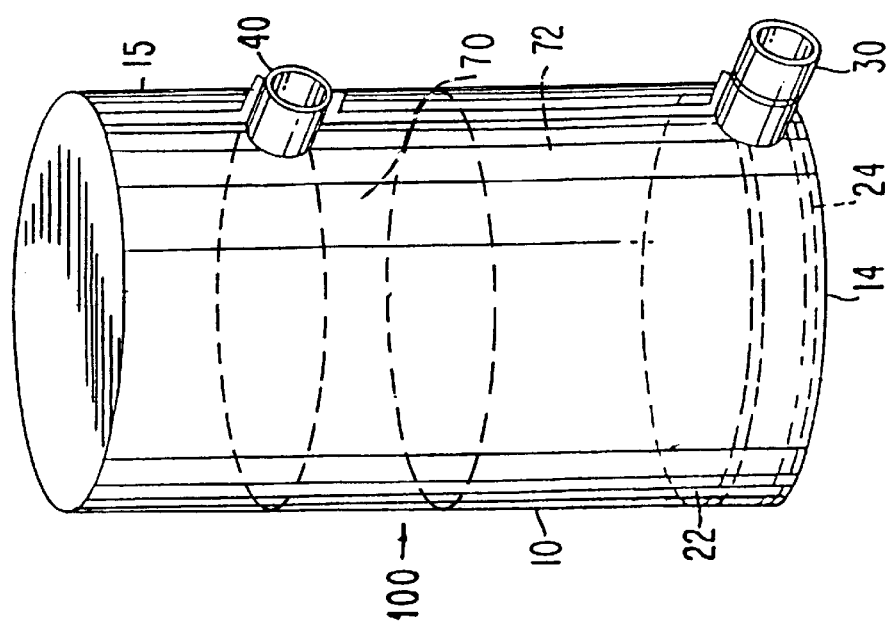
FIG. 4 is a perspective view of the organic waste composting system containing organic waste and finished compost in accordance with the present invention.

As shown in FIG. 4, composting begins by depositing a quantity of finished compost 72 into container 10. Next, a quantity of organic waste 70 is deposited into container 10. Placing the relatively dry finished compost 72 into the bottom of container 10 helps ensure that air floor 20 does not become clogged with relatively moist organic waste 70. To promote the microbial reactions necessary to decompose matter into compost, surface area should be maximized. The individual pieces of organic waste 70 should preferably be sized to achieve a surface area to volume ratio of from approximately 4:1 to approximately 10:1 square inches to cubic inches before depositing within container 10. Organic waste 70 may be sized manually or automatically by the use of a hammermill, for instance. The finished compost acts as a dry, solid bulking agent for the organic waste which has a high water content. Optimal moisture content of the initial mixture of organic waste and finished compost is between 45% and 60%. Accordingly, the ratio of organic waste to finished compost should be selected to achieve a moisture content of the mixture within this range.

Figure 5:
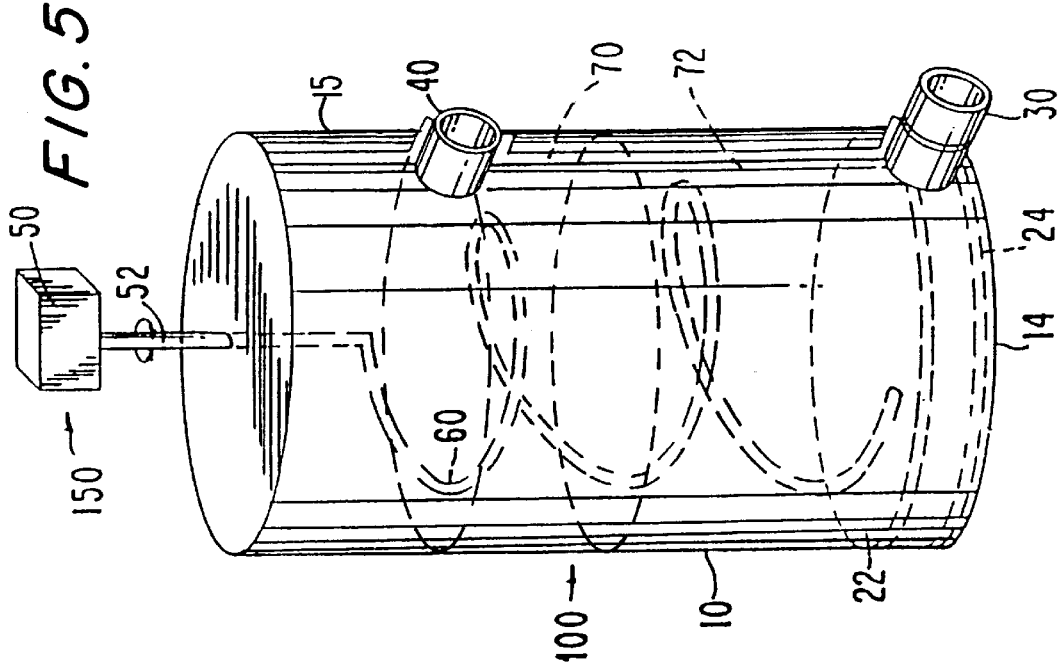
FIG. 5 is a perspective view of the organic waste composting system containing organic waste and finished compost with the mixing blade of the present invention inserted therein and prior to mixing.
Figure 6:
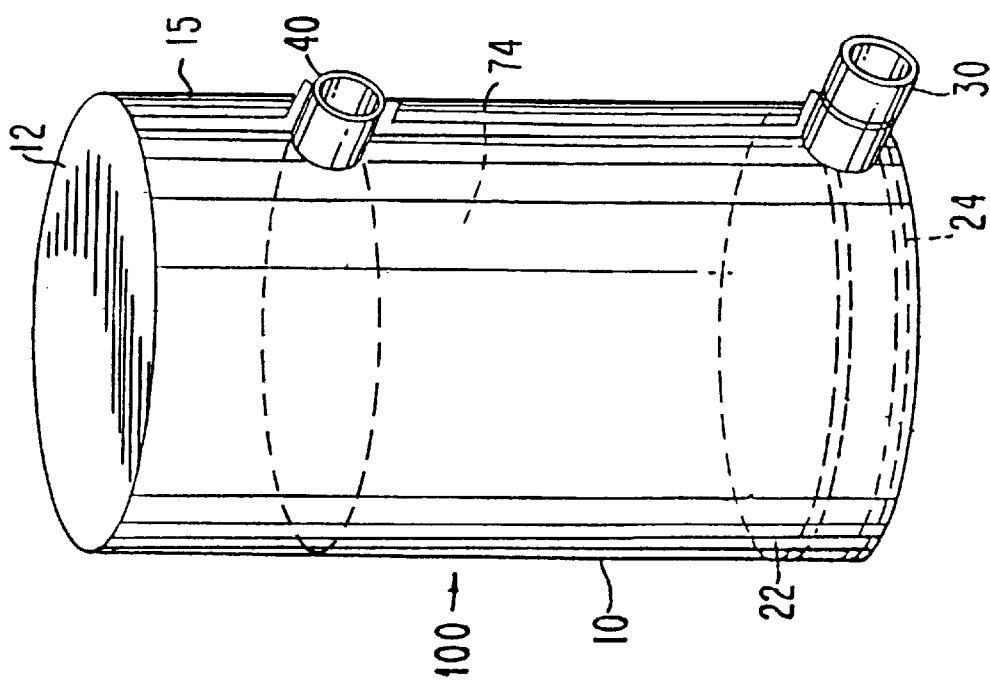
FIG. 6 is a perspective view of the organic waste composting system of the present invention containing an organic waste-finished compost mixture after mixing.

As shown in FIG. 5, the organic waste 70 and finished compost 72 are mixed together within container 10 by the use of specially designed mixing blade 60. Removable top 12 with mixing assembly 150 is replaced on container 10 to seal container 10. The motor 50 is then activated to drive mixing blade 60 via shaft 52 to mix the organic waste 70 and the finished compost 72 together, resulting in a compost mixture 74 as shown in FIG. 6. Alternatively, mixing may be performed using mixing assembly 150 with top 12 removed from container 10, after which top 12 is replaced on container 10 to allow composting to proceed.

Figure 7:
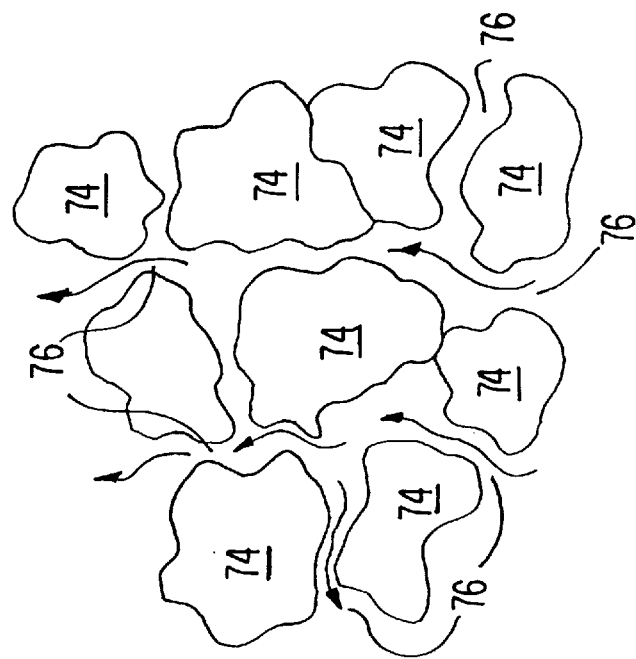
FIG. 7 is a fragmented, enlarged sectional view of an organic waste finished compost mixture showing air channels in detail.

As noted above, mixing blade 60 is configured in such a way as to ensure that composting takes place efficiently and rapidly within compost mixture 74. This is achieved by mixing the organic waste 70 and finished compost 72 together to ensure the proper moisture level and particle distribution within compost mixture 74, ensuring that the average particle size of organic waste 70 is optimized to provide for effective colonization of decomposing microorganisms (bacterial communities) on the surface of organic waste 70, and creating air channels 76 between particles of compost mixture 74 as shown in FIG. 7. These air channels 76 support rapid growth of bacterial communities which break down the degradable substratum in a very short time frame by providing oxygen to the bacteria and by transferring heat, carbon dioxide, water vapor and ammonia away from compost mixture 74. Mixing blade 60 achieves this type of optimal mixing without compaction by virtue of its unique design described above.

The rate of decomposition is proportional to the surface area of the waste available for the colonization of microorganisms which perform the decomposition. Hence, it is desirable to maximize the surface area-to-volume ratio of the organic waste 70. Optimally, the surface area-to-volume ratio of organic waste 70 should approach 10 $cm^2/cm^3$, and the particle size of compost mixture 74 is preferably reduced to approximately 0.1 to 1.0 cubic inches, a size which allows for rapid colonization by microbes in about 4–12 hours. Given the irregular shape of "chunks" of compost mixture 74, this results in a high volume of free air space (approximately 25–40%) in compost mixture 74. Putrescible organics are broken down rapidly, in about 3–6 days. Thus, mixing blade 60 of the present invention is designed to provide effective mixing, particle sizing and air channel creation by using a slowly rotating blade which takes advantage of the viscoelastic properties of the compost mixture 74.

As noted above, compost mixture 74 preferably has an initial moisture content of approximately 45% to 60%. Thus, compost mixture 74 has certain fluidic properties and is, in fact, a viscoelastic material. Mixing blade 60 of the present invention is therefore configured and employed so that the maximum velocity gradient, or rate of shear, is approximately equal to the surface tension of water, which is further less than the matrix of forces connecting the microbial films and the compost mixture 74. Such a configuration ensures that the ordered structure of the microbial films will not be broken by the mixing blade 60 and that compost mixture 74 will not be compacted. Breaking the microbial films would require them to reorganize themselves to achieve the same waste-processing capacity, which takes time and would reduce the rate of decomposition of the compost mixture 74.

Thus, mixing blade 60 is employed to shred the organic waste 70 within compost mixture 74 into optimally sized particles without compacting. This is generally achieved by rotating mixing blade 60 at an angular velocity of about 1–100 radians/second. More particularly, in a configuration in which container 10 is a standard 55-gallon drum, optimal mixing is achieved between about 10 and 100 revolutions per minute. This yields the desired particle size of about 0.1 to 1.0 cubic inches and also creates a large volume of air channels 76 within compost mixture 74.

After the organic waste 70 and finished compost 72 are initially sized, mixed and distributed by mixing blade 60, air is circulated through air channels 76 within compost mixture 74 by forcing air into container 10 through air inlet port 30 by using a blower, a fan or other suitable means. Air rises through air floor 20 into air channels 76, providing oxygen to the decomposing bacteria adhering to compost mixture 74. Alternatively, the air flow may be reversed by blowing air into container 10 through air exhaust port 40 and allowing it to flow downwards through the air channels 76 in compost mixture 74 thereafter exiting through air inlet port 30. Typically, mixing blade 60 need only be employed to initially mix the organic waste 70 and finished compost 72 together. However, should condensation occur near the inner walls of the container, mixing blade 60 may be used again to distribute the moisture. Further, if the temperature of the compost mixture 74 should exceed approximately 140° F. during the decomposition process, hardpan may occur at the bottom of container 10, and mixing blade 60 may be used to break the hardpan and return porosity to the compost mixture 74.

Near the top of container 10, air leaves the container via air exhaust port 40, carrying with it the gaseous by-products of the decomposition process: carbon dioxide, water vapor, ammonia and heat. At this point, this exhaust air can be noxious. In composting systems of the past, the exhaust air would be filtered by a separate biofilter or the like to remove the odor and harmful gaseous components.

Utilizing a series of organic waste composting systems of the present invention, the exhaust air may be reused to enhance further composting in a second container 10, and may be eventually discharged in an odorless, non-toxic state. As shown in FIG. 8, a plurality of organic waste composting systems, 100a, 100b and 100c, are connected in series. A first organic waste composting system 100a, identical to container 10 described above, is connected to a blower 35 or other air supply at its air inlet port 30a and performs composting in accordance with the invention. The air exhaust port 40*a* of the first organic waste composting system 100*a* is connected by a first air hose 45*a* to the air inlet port 30*b* of a second organic waste composting system 100*b*. Likewise, the air exhaust port 40*b* of the second organic waste composting system 100*b* is connected by a second air hose 45*b* to the air inlet port 30*c* of a third organic waste composting system 100*c*. Any desired number of organic waste composting systems 100 may be sequentially connected in this manner. Organic waste composting system 100*b* may contain a more mature compost than that contained in composting system 100*a*, and composting system 100*c* may contain the most mature compost in the system.

By exhausting the waste heat, gases and humidity from first composting system 100*a* to second composting system 100*b* containing a more mature compost, the waste heat, humidity and unused oxygen of first composting system 100*a* are incorporated into the total efficiency of the system because the same air stream moves through composting vessels in series. High carbon dioxide concentrations from the initial composting system 100*a* also pass through any remaining vessels and cause downstream growth of fungal mycelia as a result of the carbon dioxide enrichment in the downstage composts. Similarly, the waste products of the more mature compost in composting system 100*b* are input to a further downstream compost contained within composting system 100*c*, composting system 100*c* being a more mature compost then that found in composting systems 100*b* and 100*a*. Through the use of these waste products, the downstream composting systems contained within the downstream containers act as biofilters. As a fully mature compost is removed from the system, the preceding containers within the system are each moved up one "stage" within the system so that in the example of FIG. 8, composting system 100*b* would be the final stage, compost contained within composting system 100*a* would be an intermediate earlier stage acting as a biofilter, and a less mature or first-stage compost would exhaust its gaseous by-products into the inlet port 30*a* of composting system 100*a*.

It should be noted that this system of composing different stages of compost in series may also be accomplished in a single container by using several layers of compost, each layer of which has achieved a different stage of composting. For example, in a container of sufficient volume to hold three layers of compost, each having reached a different stage of decay, the most mature compost could be deposited into the bottom of the container, the intermediate compost could be placed thereon, and the youngest compost could be placed on top. Each layer could be mixed using the blade of the present invention when deposited into the container without disturbing the layer below. In this embodiment, the air flow through the container is preferably reversed; that is, air is blown into the container 10 through air exhaust port 40 and flows downward through the compost mixture 74 exiting the container 10 through air inlet port 30. With the flow of the air reversed in this manner, the lower, more mature layers of compost would act as a biofilter in much the same way that the composting systems 100 holding the more mature compost described above act as biofilters.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An organic waste composter for composting organic waste, comprising:
    a container, a first port and a second port disposed in said container, and a waste-impermeable but gas permeable air floor, at least the second port being disposed within said container to allow gases to travel into the container through the first port, through the air floor and out of the container through the second port; and
    a blade dimensioned so that the shear forces produced by the blade when rotated within the pre-compost organic waste are equal to the viscoelastic forces between particles forming the pre-compost organic waste.

2. The organic waste composter of claim 1, wherein the blade is helical.

3. The organic waste composter of claim 2, wherein the blade has a blade angle of from about 10° to about 30°.

4. The organic waste composter of claim 1, wherein the blade has a cross-sectional width at its base of from about ¼ inch to about ½ inch.

5. The organic waste composter of claim 1, wherein the blade has a cross-sectional height at its base of from about ⅜ inches to about ⅝ inches.

6. The organic waste composter of claim 1, wherein the blade has a cross-sectional width at its tip of about ½ inch.

7. The organic waste composter of claim 1, wherein the blade has a cross-sectional height at its tip of from about ¹⁄₁₆ inch to about ⅛ inch.

8. The organic waste composter of claim 1, wherein said air floor includes a screen which is permeable to gases and substantially impermeable to said organic waste.

9. The organic waste composter of claim 8, wherein said air floor further comprises a perforated hose coupled to one of said first and second ports.

10. The organic waste composter of claim 1, wherein said container includes a gas impermeable floor, a gas impermeable sides and a gas impermeable top.

11. An organic waste composter for composting organic waste, comprising:
    a container, a first port and a second port disposed in said container, and a waste-impermeable but gas permeable air floor, at least the second port being disposed within said container to allow gases to travel into the container through the first port, through the air floor and out of the container through the second port;
    a blade dimensioned so that the shear forces produced by the blade when rotated within the pre-compost organic waste are substantially equal to the viscoelastic forces between particles forming the organic waste;
    said container includes a gas impermeable floor, a gas impermeable sides and a gas impermeable top; and
    said top selectively removable from said container.

12. The organic waste composter of claim 10, wherein said blade is mounted on said top.

13. An organic waste composting system, comprising:
    a first gas impermeable organic waste composter comprising a first container, a first inlet port disposed in said first container, a first exhaust port disposed in said first container, and a first waste-impermeable but gas permeable air floor, the first inlet port and first exhaust port being disposed within said container to allow gases to travel into said first container through the first inlet port, through the first air floor and out of said first gas impermeable container through the first exhaust port; and at least a second organic waste composter comprising a second container, a second inlet port disposed in said second container, a second exhaust port disposed in said second container, and a second waste-impermeable but gas permeable air floor, the second inlet port and second exhaust port being disposed within said second container to allow gases to travel into said second container through the second inlet port, through the second air floor and out of said second container through the second exhaust port, said second inlet port being in fluid communication with said first exhaust port.

14. The organic waste composting system of claim 13, wherein said at least two organic waste composters are coupled so that a compost mixture is disposed within said second container and a second compost mixture is contained in said first container, said first compost having a first age; said second compost having a second age and said first age being greater than said second age.

15. The organic waste composting system of claim 13, further comprising air supply means coupled to said first inlet port for supplying air to said first container.

16. The organic waste composting system of claim 13, wherein said first and said at least second containers each further includes a gas impermeable floor, gas impermeable sides and a gas impermeable top.

17. An organic waste composting system, comprising:

a first organic waste composter comprising a first container, a first inlet port disposed in said first container, a first exhaust sort disposed in said first container, and a first waste-impermeable but gas permeable air floor, the first inlet port and first exhaust port being disposed within said container to allow gases to travel into said first container through the first inlet port, through the first air floor and out of said first container through the exhaust port; and at least a second organic waste composter comprising a second container, a second inlet port disposed in said second container, a second exhaust port disposed in said second container, and a second waste-impermeable but gas permeable air floor, the second inlet port and second exhaust port being disposed within said second container to allow gases to travel into said second container through the second inlet port, through the second air floor and out of said second container through the second exhaust port, said second inlet port being in fluid communication with said first exhaust port;

said first and said at least second containers each further including a gas impermeable floor, has impermeable sides and a gas impermeable top;

said gas impermeable tops being selectively removable from said first and said at least second containers.

18. The organic waste composting system of claim 13, wherein said first and said at least second containers each further includes a waste impermeable but air permeable air floor.

19. The organic waste composting system of claim 18, wherein said air floors further include a screen which is impermeable to gases and substantially permeable to organic waste.

20. The organic waste composting system of claim 19, wherein said air floor of each container further comprises a perforated hose coupled to the inlet port of said container.

21. The organic waste composting system of claim 13, wherein said first and said at least second containers each further includes a waste impermeable but air permeable air floor;

a first organic waste composter comprising a first container, a first inlet port disposed in said first container, a first exhaust port disposed in said first container, and a first waste-impermeable but gas permeable air floor, the first inlet port and first exhaust port being disposed within said container to allow gases to travel into said first container through the first inlet port, through the first air floor and out of said first container through the exhaust port; and at least a second organic waste composter comprising a second container, a second inlet port disposed in said second container, a second exhaust port disposed in said second container, and a second waste-impermeable but gas permeable air floor, the second inlet port and second exhaust port being disposed within said second container to allow gases to travel into said second container through the second inlet port, through the second air floor and out of said second container through the second exhaust port, said second inlet port being in fluid communication with said first exhaust port;

said air floor of each container further comprising a manifold which is in fluid connection with said inlet port of said container.

22. A method for composting organic waste, comprising:

depositing finished compost in a container with an inlet port, an exhaust port and a waste-impermeable but air permeable air floor, the inlet port and exhaust port being disposed so as to allow gas to travel into the container through the inlet port, through the air floor and out of the container through the exhaust port;

depositing organic waste in the container; and mixing the organic waste and the finished compost with a blade dimensioned so that the shear forces produced by the blade when rotated within the organic waste are equal to the viscoelastic forces for the particles of the mixture.

23. The method of composting organic waste of claim 22, wherein the mixture of organic waste and finished compost is between about 45% and about 60%.

24. The method of composting organic waste of claim 22, wherein the blade is rotated at an angular velocity of from about 1 to about 100 radians per second.

25. The method of composting organic waste of claim 22, wherein the blade is rotated at an angular velocity of from about 10 to about 1000 revolutions per minute.

26. The method of composting organic waste of claim 22, further comprising blowing air into said container at said inlet port.

27. An organic waste composter for composting organic waste, comprising;

a container, a first port and a second port disposed in said container, and a waste-impermeable but gas permeable air floor, at least the second port being disposed within said container to allow gases to travel into the container through the first port, through the air floor and out of the container through the second port; and a helical blade having a blade angle of from about 10° to about 30°, the blade having a cross-sectional width at its base of from about ¼ inch to about ½ inch, a cross-sectional height at its base of from about ⅜ inches to about ⅝ inches, and a cross-sectional height at its tip of from about 1/16 to about ⅛ inch.

* * * * *